Feb. 20, 1962     E. L. WIMMER ETAL     3,022,174
ART OF PROCESSING CEREAL GRITS
Filed Sept. 28, 1959
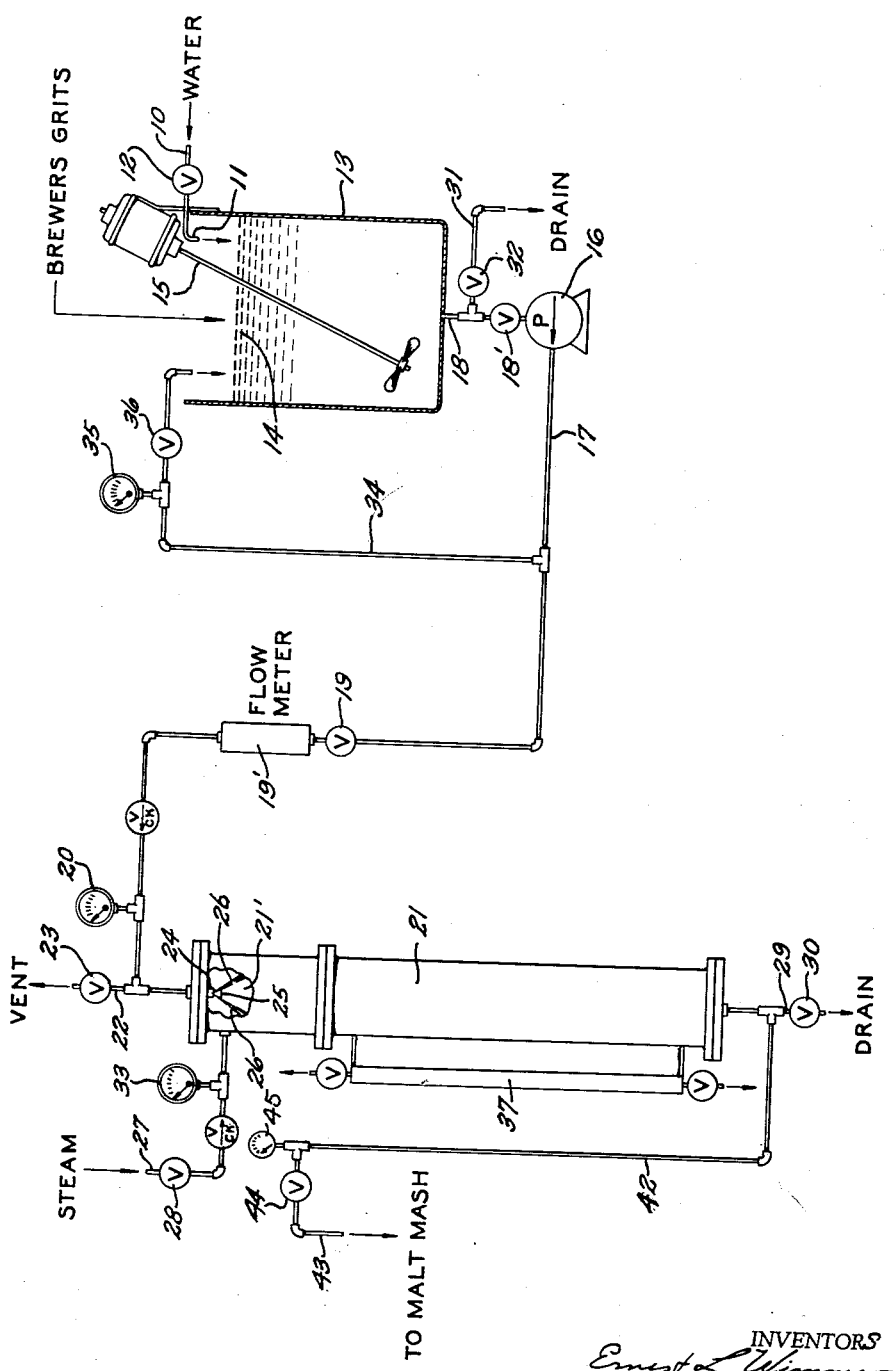
INVENTORS
Ernest L. Wimmer
Andrew B. Devitt
BY
ATTORNEYS.

United States Patent Office 3,022,174
Patented Feb. 20, 1962

3,022,174
ART OF PROCESSING CEREAL GRITS
Ernest L. Wimmer, Elm Grove, and Andrew B. Devitt, Milwaukee, Wis., assignors to Chas. A. Krause Milling Co., Milwaukee, Wis., a corporation of Wisconsin
Filed Sept. 28, 1959, Ser. No. 842,882
9 Claims. (Cl. 99—51)

This invention relates to improvements in the art of processing cereal grits.

The customary procedure in the production of beer wort consists of cooking or gelatinizing a starch bearing raw material, and converting the gelatinized starch to fermentable sugar and dextrines by combining the cooked starch with a slurry of enzyme-rich malt (malted barley) and subsequently filtering from the residual grains. The starch-bearing raw material is generally a granular portion of horny cereal endosperm known as brewer's grits.

In the conventional cooking process a starch-bearing raw material or adjunct is slurried in water at a concentration of about 20% and is cooked to the boiling point. After holding at the boiling temperature for between ten minutes and one hour, with constant agitation, the cooked adjunct is allowed to run into an aqueous malt slurry for the enzymatic conversion. In the cooking of the adjunct in this manner unmanageable high viscosities would be obtained if it were not for the addition of ground barley malt to the brewer's grits (adjunct slurry) before the cooking process begins. This malt addition, generally about 10% of the adjunct, tends to liquefy or thin the cooked mash during the cooking process. The required cooking of this barley malt addition at boiling temperature extracts certain strong-flavored ingredients from the malt which may result in an undesirably strong-flavored beer. In order to overcome this, the practice of adding amylolytic enzymes of bacterial origin has been adopted. Use of these enzymes means added cost to the brewery inasmuch as the malt which is eliminated from the cooked mash is generally added in the main conversion part of the process so as not to alter the total malt concentration of the grain bill.

Several problems may be encountered during the conventional cooking process as presently conducted. If the cooking process is carried out longer than necessary, there is a tendency to break down and disperse the protein structure which is inherent in the brewers grits. This dispersion of protein may result in an exceptionally slow filtration rate when the converted mash is filtered. If there is an attempt to shorten the cooking process, the grits may not be cooked long enough to completely gelatinize the contained starch, thereby resulting in a low yield of extracted fermentables.

It is also obvious that the present batch cooking procedure for the starch adjunct in the brewery process is a time-consuming step. Time is required to meter out the required water, then to weigh out and mix in the desired amount of adjunct. Heating of the adjunct slurry to the desired gelatinization temperature is also quite time consuming and then it has been necessary to hold the hot adjunct a finite and often lengthy period at the temperature of cooking. The cooked mash finally must be run into the barley malt slurry and this in itself is time consuming.

It is a general object of the present invention to provide an improved process of cooking starch-bearing raw material in the production of beer wherein all of the aforementioned problems and difficulties of the usual batch process are eliminated or minimized.

A further object of the present invention is to provide a method as above described wherein the starch-bearing raw material used in the production of beer is cooked more completely than with present processing methods.

A further object of the invention is to provide a process as above described in which the potential extractable solids in the mash is higher, and in which the subsequent filtration of the enzyme-converted mash is more rapid.

A further more specific object of the invention is to provide a process as above described wherein the adjunct is cooked at a relatively high temperature for such a short time, using a continuous process, that the starch does not have time to emerge from the grit and cause viscosity problems, the adjunct being discharged into the malt before the starch has had a chance to come out of the cooked grit.

With the above and other objects in view, the invention consists of the improvements in the art of cooking starch-bearing raw material in the production of beer and all of its steps and procedures as set forth in the claims, and all equivalents thereof.

In the accompanying drawing, in which an example is shown of preferred apparatus used in carrying out the improved method, the figure is a diagrammatic view of said equipment which may be used in carrying out the process of the present invention.

The process of the present invention includes the preparation of an aqueous slurry of a brewer's adjunct preferably in a continuous manner and the pumping of said slurry to a relatively small pressure vessel in which provision is made for the injection and intimate mixing of high pressure steam with the adjunct slurry. During its short interval of passage through the pressure vessel the adjunct slurry is very quickly heated to a very high temperature, being in the holding vessel a finite length of time during which the adjunct is cooked or gelatinized to the ultimate desired degree. The cooked adjunct is continuously discharged from the pressure vessel whereupon excess steam is flashed to the atmosphere and the cooked adjunct is dropped immediately into the barley malt slurry.

Referring more particularly to the accompanying drawing, the numeral 10 designates a water supply pipe having an outlet 11 positioned to discharge quantities of water as metered by a valve 12, into a tank 13 adapted to contain a slurry of brewers' grits and water as indicated at 14. A suitable mixing device 15 may be used in the tank 13 to thoroughly mix the water and grits. The slurry is adapted to be continuously pumped by a pump 16 through a line 17, the pump being in communication with the bottom of the tank 13 through an outlet line 18, equipped with a valve 18'. The line 17 may be provided with a valve 19, with a flow meter 19', and with a pressure gauge 20, and said line leads into the top jet chamber 21' of a cooking vessel 21. There may be a vent line 22 in communication with the slurry inlet line 17, which vent line is equipped with a valve 23. The discharge nozzle 24, within the jet chamber 21', is adapted to discharge against an inverted cone 25 so as to cause the slurry to be sprayed into the jet chamber of the cooking vessel 21 as at 26. A steam line 27 leading from a suitable high pressure source past a valve 28, is adapted to continuously cause blending or sparging of the steam with the adjunct slurry which is being sprayed. As an alternative, the adjunct slurry may be rapidly heated by indirect steam in any efficient continuous heat exchanger such as a commercially available "Votator" which may be used in lieu of the vessel 21.

Leading from the bottom of the cooking vessel 21 is a pipe 42 which is adapted to discharge through a discharge end 43 into the malt mash, there being a suitable control valve 44 at the discharge and there being a temperature gauge 45 ahead of the valve.

The cooking vessel 21 is also provided with a drain pipe 29 under control of a valve 30, and the tank 13 with a drain pipe 31 under control of a valve 32. There may also be a pressure gauge 33 in the steam line 27. In addition there may be a re-circulation line 34 leading from the line 17 back to the tank 13, with a pressure gauge 35 and a valve 36 in said line as indicated.

The high-fluidity, low-viscosity nature of the high-starch content cooked mash is the most unobvious and unpredictable feature of the invention. The starch content of the granular adjunct is thoroughly cooked by the present process and yet because of the short heating time has not had sufficient opportunity to diffuse completely from the granular particle into solution and thereby create unmanageable viscosity problems. In addition, a temperature range has been selected which is so high that the starch which does diffuse into solution out of the grit is instantaneously degraded to a low viscosity starch. Thus it has been known that in starch slurries which have been gelatinized and heated above 225° F., there is a rapid decrease in viscosity as the swollen gelatinized granules are rapidly disorganized. Below is detailed the critical conditions of temperature and holding time for thoroughly cooking the starch contained in the brewers' grits so that it is readily digested by malt enzymes, for limiting the diffusion of the starch from the grit to solution to a minimum degree, and for degrading the diffused starch to a low viscosity for optimum handling and conversion properties.

RAW MATERIALS

The raw materials for our cooking process are the usual cereal adjuncts customarily employed in brewing technology. In this group we include the horny endosperm portion of the preferred cereals, corn, rice and sorghum. In addition, we include wheat grits, barley grits and granules of malted barley which are sometimes employed as starch adjunct sources.

The conditions recommended for optimum cooking are, to a degree, a function of the particle size of the brewers' grit. The most common sized brewers' grit is sized or graded between a U.S. standard #14 and a U.S. standard #40 sieve. Smaller sized grits are also employed which range down in particle size so that they are contained between a U.S. standard #30 and a U.S. standard #80 sieve. Ranges in cooking conditions are such to cover this variance in particle size, i.e., finer grits require less severe cooking conditions.

THE ADJUNCT SLURRY

The adjunct slurry for cooking is generally in the range 15 to 25% adjunct in water. The water may be of ambient temperature or preferably in a range up to 120° F. Warm water is preferred to hasten the penetration of water into the adjunct particle. It is advisable that there be a holding time of the uncooked adjunct slurry in the tank 13 of at least 5 minutes to allow penetration of water into the coarser particles prior to entering the cooking chamber. The slurry tank 13 may be of large size and the adjunct slurry prepared in a large batch by addition of grits and water or, preferably, the grits may be fed continuously along with continuous metering of water past valve 12 in the proper ratio into a small vigorously agitated holding tank with sufficient capacity to allow the above mentioned penetration or soaking of water to occur.

COOKING TIME

An important feature of the invention is the cooking time as related to other factors. Cooking time may be varied as required by controlling the level in the vessel 21 through the outlet control 44. This level is indicated by a sight glass 37. As will be hereinafter explained, it is important that the cooking time be relatively short. Furthermore, the cooking time must be closely integrated with the cooking temperature. The preferred time which the slurry is subjected to the cooking process in the vessel 21 is between 10 seconds and two minutes. Finer grits are usually subjected to the cooking process for one of the shorter periods, and at a lower temperature, whereas the coarser grits must be subjected to the cooking process for a period closer to the top end of the range and at higher temperature. The regular corn grits heretofore described are most efficiently cooked when subjected to the cooking process for between forty seconds and one minute.

COOKING TEMPERATURE

The cooking temperature is relatively high, and where the steam sparging process illustrated is employed, sufficient steam is introduced into the cooking chamber 21 to raise the temperature of the adjunct slurry into the range of 225–325° F. It is important that there be no excess cooking time at the lower end of the range as this might result in undue thickening. It is also important that there be no excess cooking time at the upper end of the temperature range as this may result in incipient scorching of the adjunct and a resultant off-flavor in the beer. The optimum temperature for regular-sized corn grits is between 245° and 285° F.

By the use of a relatively high cooking temperature for a relatively short cooking period, and with the prompt discharge into the malt of the cooked product resulting from the use of the continuous process, it is possible to have a low viscosity for the cooked adjunct. This is accomplished without use of a malt addition, with its attendant problems, for the purpose of holding down viscosity.

The following examples are illustrative of the present invention:

Example I

Forty three pounds of regular brewers grits derived from corn (98% between a U.S. 14 and a U.S. 40 standard sieve) was slurried in 160# of water. After stirring 10 minutes, the slurry was pumped to the continuous sparge steam cooker at a rate of 1.2 gallons per minute. Steam was injected into the cooker so as to maintain an exit temperature of the cooked grits of 265° F. The steam pressure of the cooking chamber was 75 p.s.i. The holding time in the cooking chamber was 50 seconds. Microscopic examination of the cooked grits quenched in cold water showed complete rupture of the starch granules within the grit particles. The viscosity of the cooked mash was less than 700 centipoises. The dry solids content of the cooked mash was 17.4%.

The viscosity of similar corn brewers grits cooked according to the standard batch procedure of 30 minutes at the boiling temperature is more than 3000 centipoises.

Example II

Thirty six pounds of brewer's rice grits was slurried in 164# of water. After mixing for 5 minutes at 100° F. the slurry was cooked with sparge steam in the continuous jet cooker at a temperature of 275° F. and at a holding time of 30 seconds. The resultant cooked mash issued from the cooker at a very low viscosity of less than 200 gram centimeters. A similar brewers rice slurry of identical concentration was then cooked in the usual batch process at 212° F. for thirty minutes and the resulting viscosity was over 3000 gram centimeters.

In the following table we have compared the viscosity of regular corn grits cooked by the method of the present invention with similar grits which have been cooked by the usual cooking process, however, in the absence of malt. Viscosities were determined on the Corn Industries Research Foundation viscometer which yields a continuous recording of changes in viscosity during cooking. Samples of brewers grits cooked according to the details of the examples above by the process of the present invention were transferred as rapidly as possible from the continuous cooker to the recording viscometer. The unusually low viscosities are immediately apparent. However, it should be pointed out that as the cooked adjunct is removed from the continuous cooker, the viscosity is increasing rapidly due to diffusion of the cooked starch from the granular particle. Therefore, the viscosities of the cooked adjunct from the continuous cooking process are, in truth, even lower than indicated, because of the necessary time lag in transferring from the cooker to the viscometer.

COMPARISON OF VISCOSITIES OF CORN BREWER'S GRITS MASHES COOKED IN BATCH AND CONTINUOUS PROCESSES

| Cooking Conditions | | | Conc. of Cooked Grits, Percent | Viscosity, Centigrams |
|---|---|---|---|---|
| Cooking Method | Time | Temp., °F. | | |
| Batch | 30 Min | 212 | 12.4 | 1,050 |
| Continuous | 40 Sec | 285 | 12.4 | 75 |
| Batch | 30 Min | 212 | 15.3 | 2,520 |
| Continuous | 40 Sec | 255 | 15.3 | 320 |
| Batch | 30 Min | 212 | 17.4 | 3,150 |
| Continuous | 40 Sec | 265 | 17.4 | 720 |

ADVANTAGES OF INVENTION SUMMARIZED

This invention permits the complete cooking of the starch content of granular brewery adjuncts, i.e. brewer's grits, with a minimum time exposure to heat and agitation.

The procedure permits the increase in brewery production where a lengthy cooking process may be a production bottleneck.

The process of this invention permits the brewery to obtain maximum potential fermentable extract from the brewer's grits by the thorough rupture and cooking of the starch granules.

The process results in a maximum filtration rate of the enzyme converted wort because the granular nature of the grit has not been disrupted by excessive agitation and softening during a lengthy heat exposure.

A mild flavored beer is obtained because malt for thinning the cooker mash is not required.

While the above recited process, steps and apparatus for carrying out the same constitute preferred embodiments of the invention, changes may be made without departing from the scope of the invention as defined in the appended claims.

What we claim is:

1. In the brewing of beer wherein there is a malt mash, the steps of preparing an adjunct in the form of a slurry of starch-bearing granular particles, continuously feeding said slurry substantially free of malt and enzyme additions into a cooking chamber, continuously blending steam with the slurry in the cooking chamber to substantially instantaneously provide a cooking temperature of between 225°–325° F., continuously discharging cooked adjunct from the cooking chamber after it has been subjected to the cooking process for between ten seconds and two minutes, and promptly and continuously discharging the cooked adjunct into the malt mash before the starch has had an opportunity to diffuse completely from the granular particles in the solution to create viscosity problems, the cooking temperature being sufficiently high that the starch which has diffused out of the granular particles is promptly degraded to a low viscosity starch.

2. In the brewing of beer wherein there is a malt mash, the steps of preparing an adjunct in the form of a slurry of corn grits, continuously feeding said slurry substantially free of malt and enzyme additions into a cooking chamber, continuously blending steam with the slurry in the cooking chamber to substantially instantaneously provide a cooking temperature of between 225°–325° F., continuously discharging cooked adjunct from the cooking chamber after it has been subjected to the cooking process for between ten seconds and two minutes and promptly and continuously discharging the cooked adjunct into the malt mash before the starch has had an opportunity to diffuse completely from the grits in the solution to create viscosity problems, the cooking range being sufficiently high that the starch which has diffused out of the grits is promptly degraded to a low viscosity starch.

3. In the brewing of beer wherein there is a malt mash, the steps of preparing an adjunct in the form of a slurry of starch-bearing granular particles, continuously feeding said slurry substantially free of malt and enzyme additions into a cooking chamber, continuously blending steam with the slurry while the latter is under pressure in the cooking chamber to substantially instantaneously provide a cooking temperature of between 225°–325° F., continuously discharging cooked adjunct from the cooking chamber after it has been subjected to the cooking process for between ten seconds and two minutes and promptly and continuously discharging the cooked adjunct into the malt mash before the starch has had an opportunity to diffuse completely from the granular particles in the solution to create viscosity problems, the cooking range being sufficiently high that the starch which has diffused out of the granular particles is promptly degraded to a low viscosity starch.

4. In the brewing of beer wherein there is a malt mash, the steps of preparing an adjunct in the form of a slurry of starch-bearing granular particles, continuously spraying said slurry substantially devoid of malt and enzyme additions into a cooking chamber, continuously subjecting the spray of the slurry in the cooking chamber to the action of injected steam in such a ratio that the temperature of the slurry is substantially instantaneously raised to between 225°–325° F., continuously discharging cooked adjunct from the cooking chamber after it has been subjected to the cooking process for between ten seconds and two minutes, and promptly and continuously discharging the cooked adjunct into the malt mash before the starch has had an opportunity to diffuse completely from the granular particles in the solution to create viscosity problems, the cooking temperature being sufficiently high that the starch which has diffused out of the granular particles is promptly degraded to a low viscosity starch.

5. In the brewing of beer wherein there is a malt mash, the steps of preparing a slurry from corn grits with approximately 98% of the latter being between a U.S. 14 and a U.S. 40 standard sieve, substantially instantaneously raising the temperature of the slurry substantially devoid of malt and enzyme additions to between 245° F. and 285° F. while it is under steam pressure and holding it at said temperature for between ten seconds and two minutes, discharging the cooked grits at a temperature of between 245° F. and 285° F., and promptly directing the discharge grits into the malt mash.

6. In the brewing of beer wherein there is a malt mash, the steps of substantially instantaneously raising the temperature of an adjunct in the form of a slurry of starch-bearing granular particles substantially free of malt and enzyme additions to a range of 225°–325° F. and holding it at said temperature for between ten seconds and two minutes with the temperature within said range being generally proportional to the cooking time, and discharging said cooked adjunct into the malt mash before the starch has had an opportunity to diffuse completely from the granular particles into solution to create viscosity problems, said cooking temperature being sufficiently high so that the starch which has diffused out of the granular particles is promptly degraded to a low viscosity starch.

7. In the brewing of beer wherein there is a malt mash, the steps of substantially instantaneously raising the temperature of an adjunct in the form of a slurry of starch-bearing cereal grits substantially free of malt and enzyme additions to a range of 225° F.–325° F. and holding it at said temperature for between ten seconds and two minutes with the temperature within said range generally proportional to the cooking time, and promptly discharging said cooked adjunct into the malt mash before the starch has had an opportunity to diffuse completely from the grits into solution to create viscosity problems, the cooking temperature being sufficiently high that the starch which has diffused out of the grits is promptly degraded to a low viscosity starch.

8. In the brewing of beer wherein there is a malt mash, the steps of preparing a slurry from corn grits with 98% of the latter being between a U.S. 14 and a U.S. 40 standard sieve, substantially instantaneously raising the temperature of a slurry substantially free of malt and enzyme additions to approximately 265° F. and holding it at said temperature for approximately fifty seconds while it is under an internal steam pressure in the neighborhood of 75 p.s.i., and promptly discharging the cooked grits at a temperature of approximately 265° F., and promptly directing the discharged grits into the malt mash.

9. In the brewing of beer wherein there is a malt mash, the steps of preparing a slurry of brewers rice grits, substantially instantaneously raising the temperature of the slurry while substantially free of malt and enzyme additions to approximately 275° F. and holding it at said temperature for approximately thirty seconds, and promptly discharging the cooked slurry at a temperature of approximately 275° F. and promptly directing the discharged grits into the malt mash.

References Cited in the file of this patent

UNITED STATES PATENTS

| | | |
|---|---|---|
| 2,278,470 | Musher | Apr. 7, 1942 |
| 2,451,510 | Pattee | Oct. 10, 1948 |
| 2,790,718 | Nugey et al. | Apr. 30, 1957 |

FOREIGN PATENTS

| | | |
|---|---|---|
| 545,867 | Canada | Sept. 10, 1957 |
| 573,885 | Canada | Apr. 14, 1959 |

OTHER REFERENCES

"Brewer's Manual by Nugey, A.L., 1948, published by Jersey Printing Co., N.J., pp. 15–16.